July 31, 1934.  M. M. EINSON  1,968,193
SUN GLASS SPECTACLES
Filed June 15, 1933
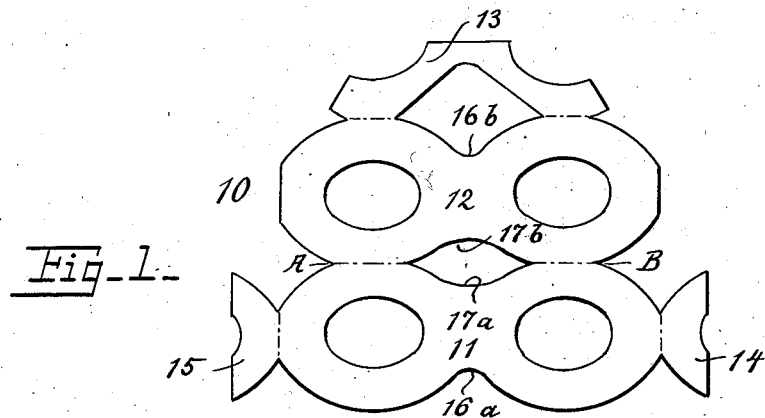
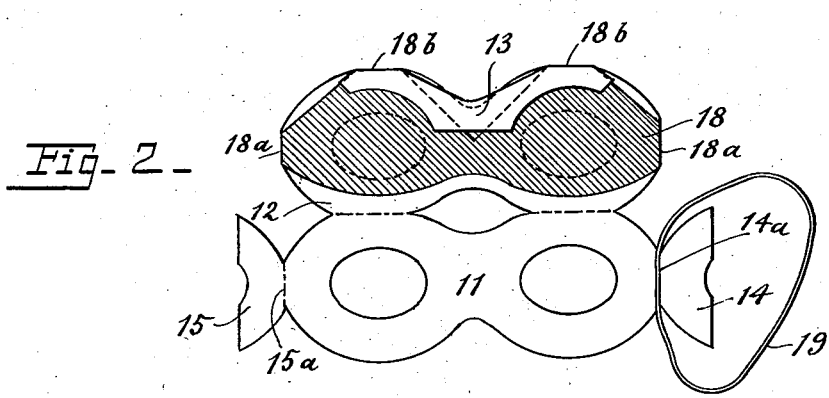
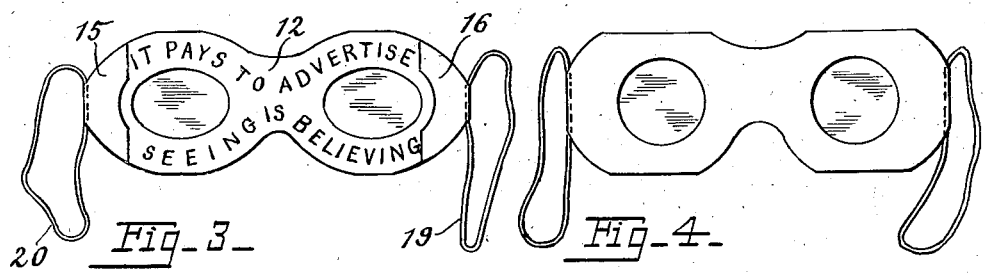
INVENTOR.
Morris M. Einson
BY
ATTORNEYS.

Patented July 31, 1934

1,968,193

UNITED STATES PATENT OFFICE 1,968,193

SUN GLASS SPECTACLES

Morris M. Einson, Yonkers, N. Y., assignor to Einson-Freeman Co., Inc., a corporation of Delaware Application June 15, 1933, Serial No. 675,938

11 Claims. (Cl. 88—41)

It is among the objects of the present invention to provide a novel and improved form of inexpensive sun glasses.

A further object of the present invention is to manufacture both the frame and the transparent oculars of the sun glass spectacles from cheap and readily available material.

Another object of the invention is to manufacture the fastening means; that is, the braces which connect the frame to the outer ears or auricles, of inexpensive material, or rather, to provide a cheap substitute for the wire loops commonly used for this purpose.

Another object of the invention is to devise a handy and convenient method to encase the transparent oculars in the spectacle frame.

Another object is to devise simple means to attach the fastening means securely to the frame.

A further and important object is to provide sun glass spectacles at such insignificant cost that they can be given away as premiums together with merchandise or distributed for advertising purposes.

A further object is to provide a form of sun glass spectacles which lends itself specifically for advertising or display purposes.

Other objects and features of the present invention will be apparent from a consideration of the following specification taken in connection with the accompanying drawing, in which—

Fig. 1 is an illustration of the blank from which the frame for the sun glass spectacles embodying my invention is made;

Fig. 2 shows the blank, with the transparent sheet for the oculars inserted, in the process of manufacture. It also indicates the way by which the fasteners are attached.

Fig. 3 shows a rear view of a pair of sun glasses, made according to the present invention, in a finished condition. It also indicates how advertising matter may be displayed upon the frame.

Fig. 4 shows a modification in the shape of the sun glass spectacles.

These illustrations, exemplifying the present inventive concept, suggest only one practical embodiment thereof, but the invention is not to be restricted to the exact details of this disclosure or illustrations, and the latter, therefore, are to be understood from an illustrative rather than a restrictive standpoint.

Referring more particularly to Fig. 1, the entire blank 10 is die-cut from a sheet of paper or cardboard, white or colored, according to requirement or fancy. This does not exclude the use of other opaque and pliable material, for instance, white or colored celluloid, tortoise shell imitation or thick metal foil. The dot and dash lines indicate where the blank form has to be folded. Said folding lines subdivide the blank into the following coherent portions: A front border 11 and a back border 12, both in the shape of a spectacle frame of rather wide margin around the eye apertures, and designed symmetrically to the common fold line A—B. The saddles 16a, 16b for the root of the nose are positioned on the outer edges, and the indentations 17a, 17b form, when joined together by folding the upper ridge of the frame. Adjoining the outer edge of the back border 12 is a fragmentary portion 13, and adjoining the lateral extremities of the front border 11 are two other fragmentary portions or lateral lobes 14 and 15 whose purposes will be explained hereafter.

The transparent oculars, which in ordinary sun glass spectacles, are made of glass, are in this case made of a single sheet of transparent glass paper of any suitable substance, be this gelatine, isinglass, or a phenol condensation product, like celluloid, cellophane or the like. While these glass substitutes serve their purpose equally well as glass and can be furnished in any desired color or thickness, they have the added advantage of cheapness and unbreakability. Such a sheet of green celluloid 18, suitably trimmed, so as not to project beyond the outer circumference of the border portions 11 and 12 and still reaching the fold lines at 18a and 18b, so as to secure a firm support by the folded frame, is shown in Fig. 2.

The process of construction for the sun glass spectacles is as follows: After the blank is cut by a die, the lower portions 15, 11 and 14 are run through a strip gluing machine which covers one side (the upper side, visible in Fig. 2) with an adhesive. Then the transparent ocular sheet 18 is placed, as shown, upon the border flap 12, and the fragmentary portion 13 is folded over its upper edges. Thereupon two rubber bands 19 and 20 are placed in alignment over the folding lines 15a and 14a, as indicated in Fig. 2, the upper border flap 12, together with ocular sheet 18 and the flap 13 is folded over into contact with portion 11 (in the direction toward the onlooker) so that flap 13 lies between portion 11 and the transparent sheet 18, and finally the lobes 14 and 15 are folded back on to the rear side of portion 12, as shown in Fig. 3, thus firmly enclosing and fastening the inserted portions of the rubbers 19 and 20. These rubber bands which are stretched over the ears of the wearer form serviceable and inexpensive substitutes for the more complicated and costly looped wires, usually employed with spectacles.

It would also be within the scope of the invention, if instead of the two short annular rubber bands, each provided for one ear respectively, one longer elastic or rubber band were attached with either end to the lobes 14 and 15, similarly to the method shown, so that it could be stretched around the back of the head.

The rather wide margins around the oculars can be used either for ornamentation or to display advertising matter thereon, and either or both sides of the doubled-up border frame could be used for this purpose, as indicated in Fig. 3. This advertising matter could be printed upon one side of the sheet from which the blanks are made before they are cut out by dies.

It is thus seen that all the different objects enumerated are attained in a cheap but efficient and satisfactory way, and a useful article is manufactured at very little cost, which can be employed in many and various ways for which ordinary protective goggles, sun shades and sun glasses are usually worn.

The modification shown in Fig. 4 differs from the formerly shown form mainly in style, showing circular oculars and a more rectangular form of border with rounded edges.

In accordance with the provisions of the Patent Statute, I have described my invention, but I desire it understood that it is not confined to the particular form shown and described, and that the invention can be carried out in other ways mechanically as well as by means of material not mentioned, without departing from the spirit of my invention, and therefore I claim broadly the right to employ all equivalent instrumentalities coming within the scope of the appended claims.

Having now described my invention, what I claim and desire to secure by Letters Patent, is:

1. A pair of sun glass spectacles comprising oculars made of transparent flexible material and fastening means consisting of a pair of elastic loops attachable to said spectacles.

2. A pair of sun glass spectacles comprising a frame and a pair of transparent oculars, both made of flexible material and fastening means consisting of a pair of elastic loops, each attachable to the end of said frame.

3. A pair of sun glass spectacles, comprising a pair of transparent flexible oculars, a frame made of flexible sheet material and fastening means consisting of a pair of loops possessing longitudinal elasticity.

4. A pair of sun glass spectacles, comprising a pair of oculars made of transparent flexible material, a frame adapted to hold said oculars in place and made of flexible sheet material and fastening means adapted to attach said frame to the ears and consisting of a pair of elastic closed loops.

5. A pair of sun glass spectacles, comprising a pair of oculars made of transparent flexible material, a frame adapted to hold said oculars in place and made of flexible sheet material and fastening means adapted to attach said frame to the ears and consisting of a pair of rubber bands.

6. A pair of sun glass spectacles, comprising a paper frame, a pair of flexible transparent oculars fixedly supported by said frame and fastening means, consisting of a pair of elastic bands, adapted to attach said frame resiliently to the ears.

7. A pair of sun glass spectacles, comprising a flexible sheet-like frame, adapted to serve as advertising space, a pair of oculars made of flexible transparent colored sheets, and elastic fastening means to attach said spectacles to the ears of the wearer comprising a pair of elastic bands.

8. In a pair of sun glass spectacles, the combination with an elastic frame adapted to envelop an elastic ocular; a pair of bands attached to the frame and adapted to fasten said spectacles about the ears of the wearer.

9. A pair of sun glass spectacles, comprising a transparent ocular sheet, a frame consisting of a bifold flexible sheet apertured in such a way as to provide eye-holes for the oculars and to envelop said transparent sheet, means to fixedly close the rims of said bifolded frame sheet and a pair of elastic loops to attach said sun glass spectacles to the ears of the wearer.

10. A pair of sun glass spectacles comprising a frame consisting of a flexible stamped-out blank sheet, apertured so as to form a double set of eye-holes for the oculars, doubled up and folded along a line midway between said two sets of eye-holes, so that said eye-holes are brought into a circumferential alignment, and a transparent flexible sheet fixedly inserted between the two sets; and resilient means to attach said sun glass spectacles to the head of the wearer.

11. A pair of sun glass spectacles comprising a double-walled frame, cut from sheetlike flexible material, a transparent flexible sheet fixedly inserted into said double-walled frame and a pair of rubber bands attached to the outer ends of said frame by being partly encased in lobes, integrally formed with said frame.

MORRIS M. EINSON.